Aug. 13, 1968  A. RASPANTE  3,396,427
BLOW-MOLDING APPARATUS
Filed Oct. 23, 1965  4 Sheets-Sheet 1
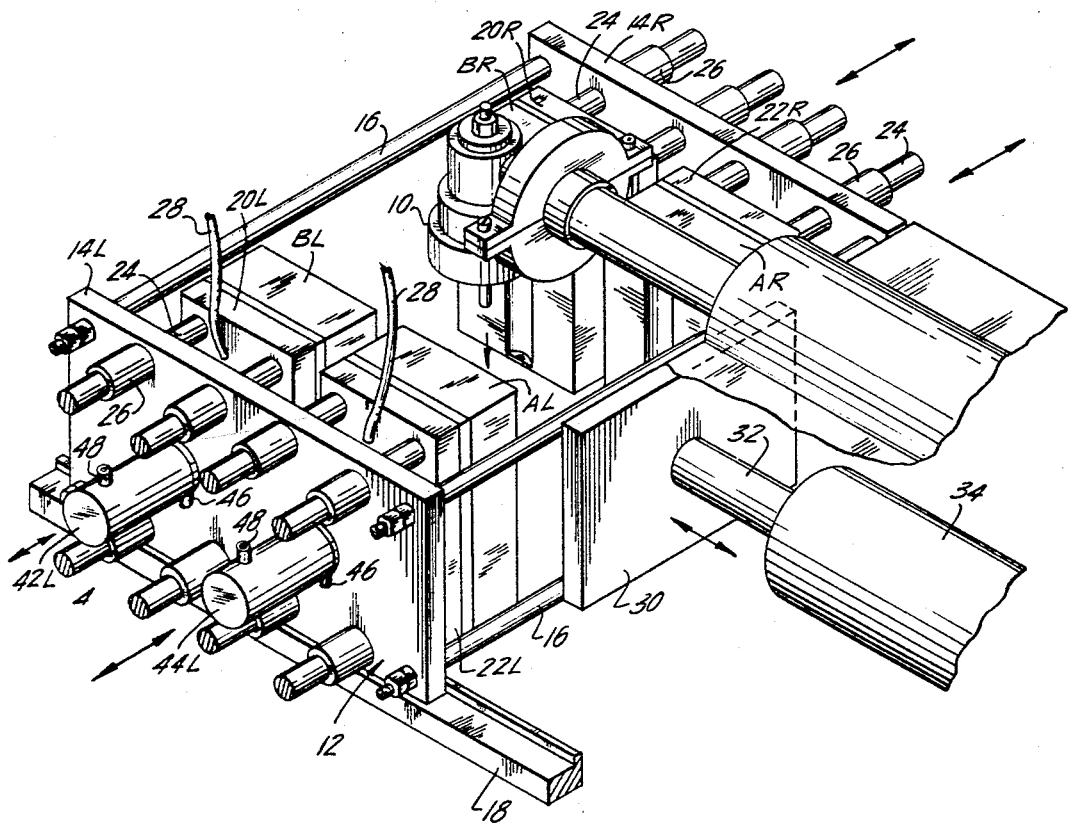
FIG.1
INVENTOR.
ANTONINO RASPANTE
BY
ATTORNEY Aug. 13, 1968          A. RASPANTE          3,396,427
BLOW-MOLDING APPARATUS
Filed Oct. 23, 1965          4 Sheets-Sheet 2
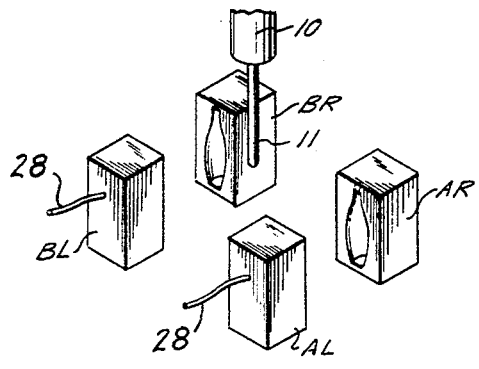
FIG. 2
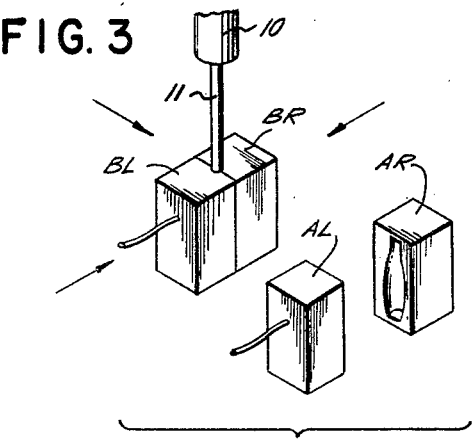
FIG. 3
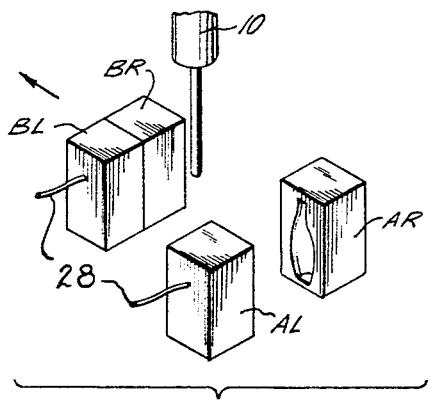
FIG. 4
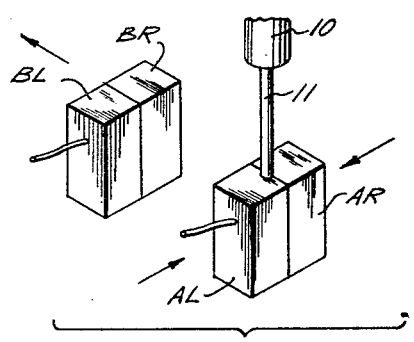
FIG. 5
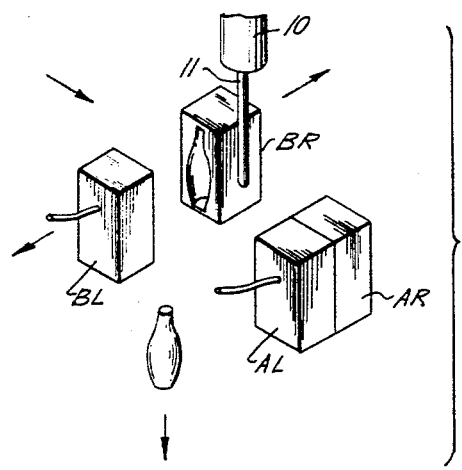
FIG. 6
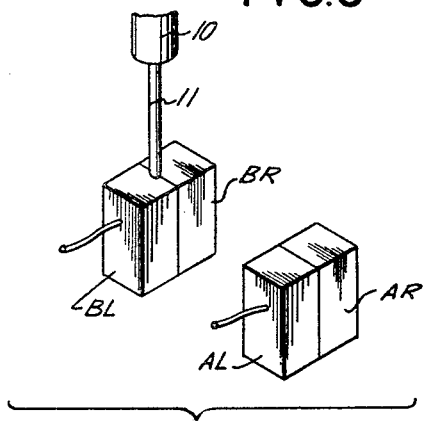
FIG. 7
INVENTOR.
ANTONINO RASPANTE
BY
ATTORNEY

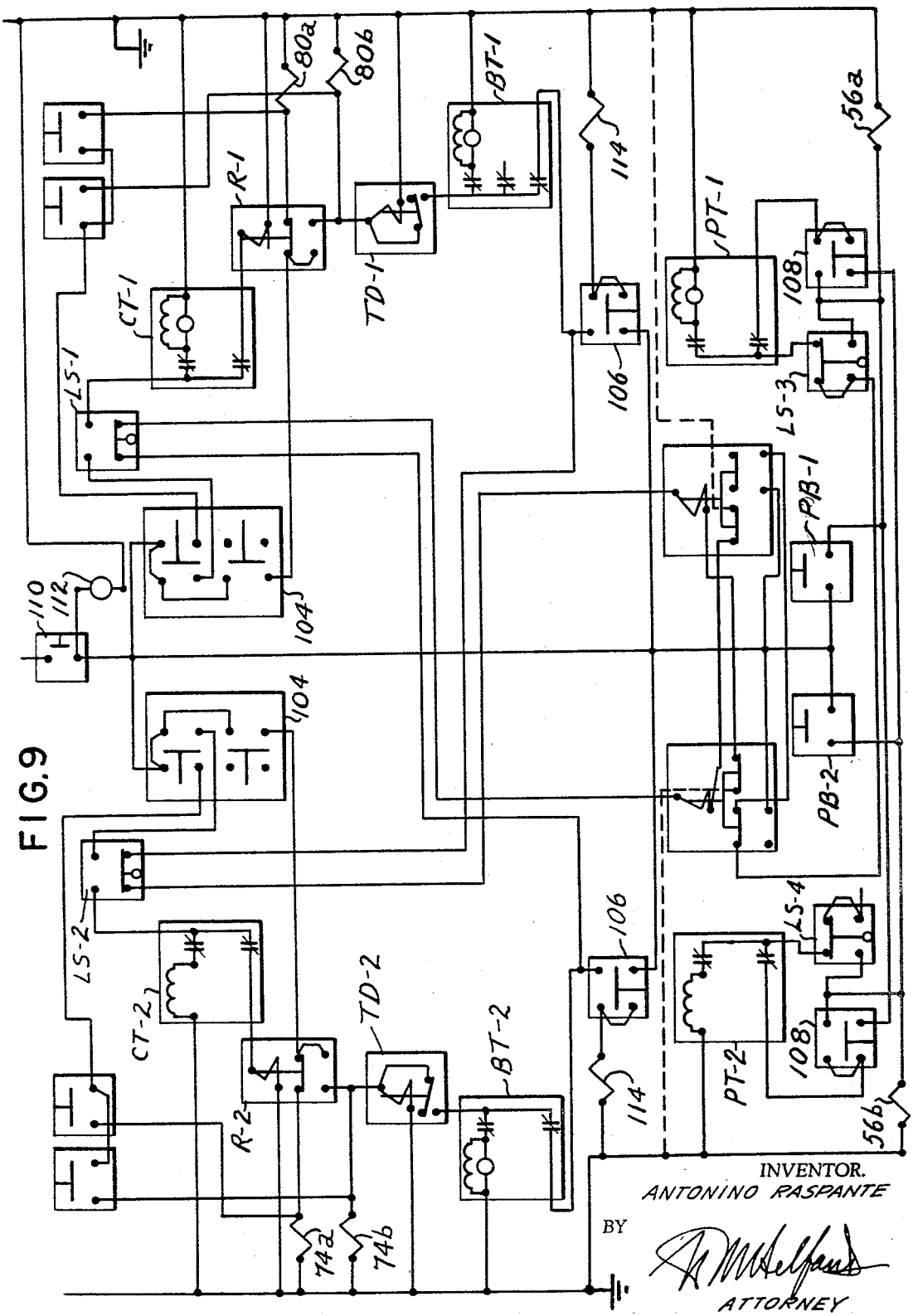

United States Patent Office 3,396,427
Patented Aug. 13, 1968

3,396,427
BLOW-MOLDING APPARATUS
Antonino Raspante, New York, N.Y.
(157 Heathcote Road, Elmont, N.Y. 11003)
Filed Oct. 23, 1965, Ser. No. 502,978
8 Claims. (Cl. 18—5)

ABSTRACT OF THE DISCLOSURE

Blow-molding apparatus consisting of a carriage including spaced parallel members each reciprocably supporting a pair of spaced mold section mounting plates for movement toward and away from a registering plate in the other member. The carriage is mounted for reciprocable movement to move each pair of registering plates to and away from a parison head; each pair of plates remaining close on their movement away from the parison head and half-way of the return stroke; each pair of plates separating during the remainder of the return stroke and closing when opposite the parison head; the latter discharging a parison tube while the separated plates move towards it; each pair of plates closing as they reach the parison head; the carriage pausing at the end of each stroke and half-way thereof.

---

The present invention relates to automatic apparatus for molding hollow articles of synthetic thermoplastic material, such as polyethylene bottles or the like, and more particularly to automatic blow-molding apparatus for forming such articles.

Blow-molding apparatus of the general type to which the present invention relates utilizes a head for discharging such material, connected to a source of supply of fused, soft, synthetic thermoplastic material, in tube form, and a plurality of complementary sections of a mold which are brought together under the plastic discharge head to snip off a section of the soft tubing, and which, thereafter receive a shot of air under pressure that forces the soft plastic against the walls of the mold cavity. Thereafter the molds are in closed phase sufficiently long to permit the plastic to seal and set in the shape of the mold cavity; the molds being subsequently separated to discharge the formed hollow article. The cycle is then repeated.

It is a primary object of the present invention to provide a blow-molding apparatus, of the character described, having a single discharge head which operates to produce molded hollow articles at a generally increased rate of speed than heretofore possible with similar apparatus of the prior art.

It is another object of the present invention to provide blow-molding apparatus, of the character described, which is completely automatic.

It is also an object of the present invention to provide blow-molding apparatus, of the character described, which may be utilized to mold more than one type of hollow articles, simultaneously.

It is a further object of the prtsent invention to provide blow-molding apparatus, of the character described, which may be started and stopped at any point in the cycle.

It is a still further object of the present invention to provide blow-molding apparatus, of the character described, which is compact and which is sure and certain in its operation.

Tha foregoing and other objects and advantages of the blow-molding apparatus of the present invention will become more readily apparent to those skilled in the art from the embodiment thereof shown in the accompanying drawings and from the description following. It is to be understood, however, that such embodiment is shown by way of illustration only, to make the principle and practice of the invention more readily comprehensive, and without any intent of limiting the invention to the specific details therein shown.

In the drawings:

FIG. 1 is a fragmentary, more or less diagrammatic, isometric view of the embodiment of the automatic blow-molding apparatus of the present invention;

FIG. 2 is a schematic, isometric view of the mold sections of the apparatus of FIG. 1, shown at an initial stage and before operation of the apparatus is commenced; both molds being open and both equidistantly spaced from the plastic tube discharge head; to opposed sides thereof;

FIG. 3 is a view similar to that of FIG. 2, showing a first step in the molding cycle of the apparatus; one of the sets of mold sections being shown in closed position below the discharge head and the other, still open, in extreme position away therefrom;

FIG. 4 is a schematic, isometric view showing a next step in the molding cycle, with both sets of mold sections in the position of FIG. 2 relative to the discharge head, but with the first set of mold sections remaining closed; and the other set open;

FIG. 5 is a view similar to FIG. 4, showing a succeeding step in the molding cycle, with the first set of the mold sections remaining closed and at extreme distance from the discharge head, while the other set of mold sections is in closed position immediately below the discharge head;

FIG. 6 is a similar view of a further step in the molding cycle with the sections of the two molds in the same position as in FIG. 2, with, however, the mold sections of the first mold spaced apart to discharge the molded article and the sections of the other mold remaining in closed position;

FIG. 7 is a final step in the molding cycle with the sections of the first mold reclosed and directly under the discharge head, as in FIG. 3, with the sections of the other mold likewise on the same position as in FIG. 3, remaining closed;

FIG. 9 is a diagram of the electronic circuit for controlling the hydraulic system of the apparatus.

Figure 8:
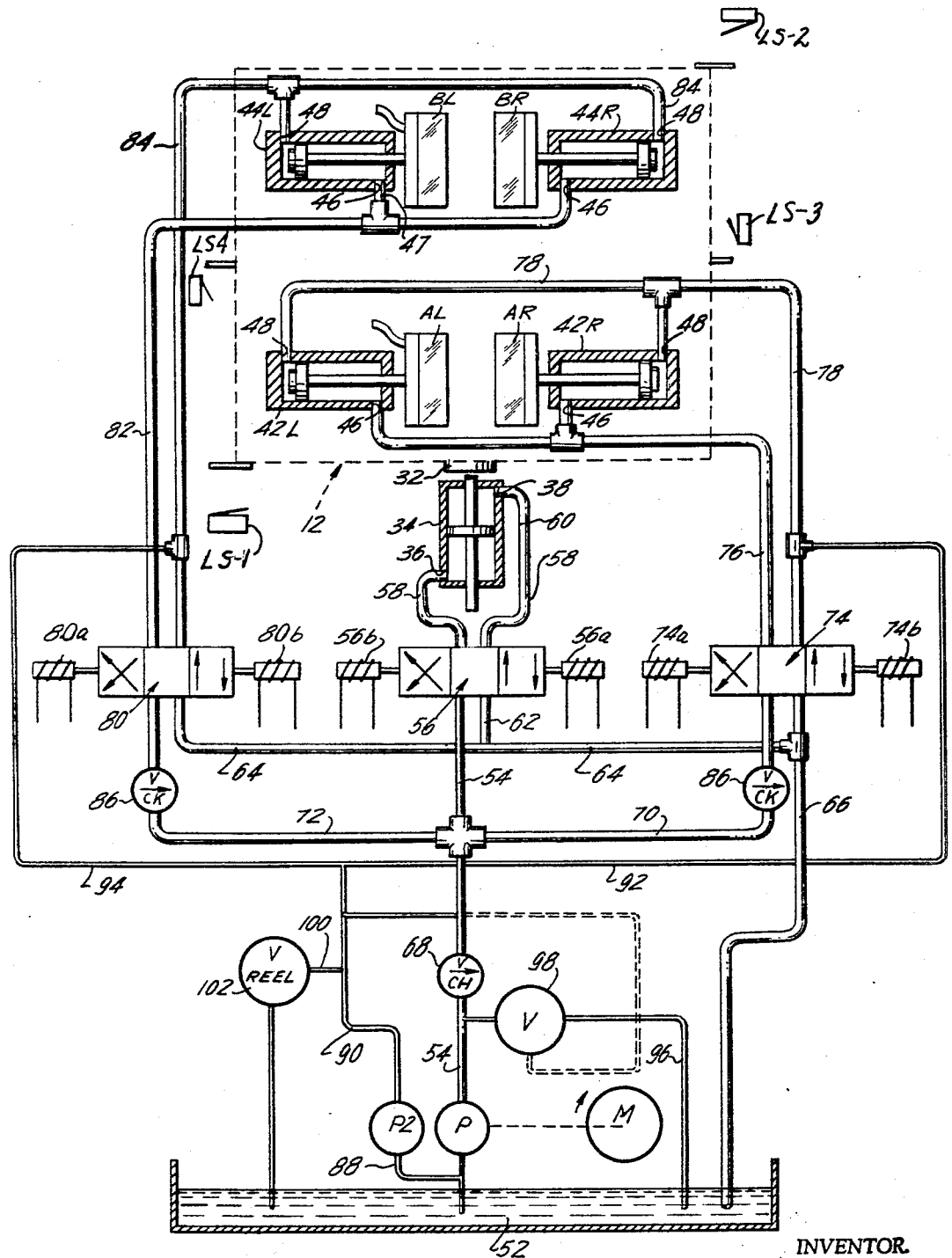
FIG. 8 is a more or less schematic, plan view, partly in section and partly in elevation, of the electrically-controlled hydraulic system for the movement of the mold-supporting structure and the mold sections into their various stations or positions.

Generally stated, the apparatus of the present invention utilizes a single mold-loading head with a pair of sets of mold sections each loaded from the same head in over-lapping cycle relation, whereby one of the molds is moved into closed and loading position while the other is being cured. More specifically, the present invention mounts the sections of two molds on an automatically reciprocable carriage which moves each pair of mold sections alternately into loading position or station while the other is moved away from loading position; automatic means being provided for moving sections of each mold into closed position as they reach the loading station and re-opening them for discharge of the molded article at a station in advance of the loading position on their return movement towards the loading position.

Still more specifically, and with specific reference to the embodiment of the invention illustrated in the drawings, the same comprises a mechanical portion consisting of a discharge head 10, for discharging parisons of heated, fused synthetic thermoplastic material in tube form, as indicated at 11. Such discharge head 10 can be of any type conventionally used in the art and it is not thought necessary to describe it, nor its source of plastic material, nor illustrate them.

The mechanical portion of the apparatus further comprises a mold-supporting carriage, generally designated as 12, which may consist of a frame formed of a pair of spaced, upright wall plates 14R and 14L, which may be connected in spaced, parallel relation by rods 16 at each of their corners. The carriage 12 is supported for reciprocal movement relative to the parison discharge head 10, on a pair of spaced rails 18, equidistantly disposed from the parison discharge head 10, to opposed sides thereof; each wall plate 14 being slidably supported by its lower edge on one of the rails 18.

Supported respectively on each of wall plates 14R and 14L in parallel relation thereto are a pair of mold-supporting plates 20R and 22R and 20L and 22L, which are each supported and guided for movement toward and away from their supporting wall plates by guide rods 24 connected to them, preferably at each corner, which guide rods reciprocate and are guided in openings formed in the adjacent wall plates 14R and 14L, as the case may be; each opening being preferably defined by an outwardly-extending guide sleeve 26. In the illustrated embodiment, mold-supporting plates 20R and 22R are shown as supporting mold sections AR and BR, respectively, while mold-supporting plates 20L and 22L are shown as supporting mold sections AL and BL, respectively, so that when plates 20R and 22R and 20L and 22L are moved toward one another, mold sections AR and BR and AL and BL, respectively, contact one another to form complete, closed molds A and B.

At least one pair of the mold-supporting plates, as 20R and 22R or 20L and 22L, is provided with an opening which is connected to a conduit 28, for compressed air that is admitted into the mold section supported thereon, in the conventional manner that is well known to those skilled in the art and not thought necessary to be specifically described and illustrated in detail.

While various means or mechanism may be provided for reciprocating the carriage 12 and for moving the mold-supporting plates and the molds supported by them toward and away from one another to close and to open, I prefer to utilize the unitary electrically or electronically controlled hydraulic system for effecting the movement of both the carriage and the mold-supporting plates.

To the foregoing end, the carriage 12 is connected, as by the plate 30, secured to one of the pairs of wall plate-connecting rods 16, to the end of a piston 32 of a hydraulic cylinder 34 having a pair of ports 36 and 38, one at each end, which may be suitably supported in fixed position in any desired manner, not thought necessary to be specifically illustrated.

Similarly, each of the mold section-supporting plates 20R and 22R and 20L and 22L is connected to the end of a piston 40, of a hydraulic cylinder 42R and 44R, and 42L and 44L, respectively, which may be mounted on the outer face of the wall plate, with its piston extending through a suitable opening formed therein; each of the pistons having a pair of ports 46 and 48, one at each end.

The hydraulic cylinder 30 is controlled, in a manner which will hereafter be more fully described, to reciprocate the carriage 12 relative to the parison discharge head 10 to alternately bring each set of complementary set of mold sections designated, for convenience, AR and AL and BR and BL, respectively, to loading position; namely, in alignment with the discharge head 10.

Simultaneously, cylinders 32R, 32L, 34R and 34L are controlled to bring each set of molds AR and AL and BR and BL together for loading, each time they are respectively moved in alignment with the discharge head 10, and to remain in closed position on their movement away from the discharge head and also part way of the return stroke, toward the discharge head, at which intermediate point they are moved apart. It may here be stated that simultaneously with or immediately after each mold is loaded by a snipping off of a section of soft, fused plastic tubing or parison 11, when the mold sections are brought together, air under pressure is injected into the closed mold and into the parison, by any type of mechanism conventionally used for the purpose, to expand the parison 11 and to press it against the interior surface of the mold cavity for shaping, in the conventional manner.

It may also be here stated that as each mold A and B is opened substantially midway of its return stroke toward the loading position, the molded article which has cured and set during the stroke away from the loading position and a portion of the stroke of return to loading position will be discharged out of the mold cavity either automatically by gravity, or by the actuation of any mechanism that is conventionally used for the purpose and not thought necessary to be specifically shown or described. Preferably, the mold sections may be controlled to pause at both the loading and at the unloading position or station.

The hydraulic system may be dual, including a relatively low pressure system, for moving the carriage and molds through their respective cycles, and relatively high pressure system parallel to and connected into the low pressure system for locking the mold sections when in closed position; such hydraulic system being more or less diagrammatically shown in FIG. 8 of the drawings. The low pressure system may comprise a source of hydraulic fluid 52, from which fluid is pumped by pump P to conduit 54, which leads to one opening of a four-way, center block valve, diagrammatically illustrated at 56. A second opening of the valve 56 is connected by conduit 58, to the nearer opening 36 of cylinder 34; the remote opening 38 of the cylinder 34 being connected by conduit 60, to the third opening of valve 56 whose fourth opening is connected to conduit 62, that is connected to return conduit 64, leading to the fluid source through main return conduit 66. Valve 56 is controlled by a pair of oppositely-acting solenoids, 56a and 56b, to respectively alternately connect opening 36 of cylinder 34 with conduit 56, and opening 38 with conduit 62, or opening 36 with conduit 62, and opening 38 with conduit 54. A check valve 68 is interposed in conduit 54 between pump P and valve 56.

Branching off from conduit 54, above check valve 68, are conduits 70 and 72. Conduit 70 connects to one opening or part of a four-way center block valve 74, another of whose openings connects by conduit 76, to the inner ports 46 of each of cylinders 42R and 42L. The other openings or ports 48 of the cylinders 42R and 42L are connected by conduit 78, to a third port of the valve 74 whose fourth port is connected to the return conduit 66. Valve 74 is controlled by oppositely-acting solenoids 74a and 74b, to alternately, respectively, connect conduit 70 with conduit 76, and conduit 78 with conduit 66; and conduit 70 with conduit 78 and conduit 76 with conduit 66, to thereby reciprocate mold sections AR and AL toward and away from one another upon the selective energization of solenoids 74a and 74b.

Conduit 72 connects to one port of a four-way center block valve 80, another of whose ports connects by conduit 82, to the ports 46 of cylinders 44R and 44L; the other openings or ports 48 of cylinders 44R and 44L are connected by conduit 84 to a third port of valve 70 whose fourth port connects with return conduit 64 which connects with main return conduit 66. Valve 80 is likewise controlled by oppositely-acting solenoids 80a and 80b, to alternately, respectively connect conduit 72 with conduit 82, and conduit 84 with conduit 64, and conduit 72 with conduit 84, and conduit 82 with conduit 64. Conduits 70 and 72 each includes a check valve 86.

The secondary hydraulic system includes a pump P2 which is connected at one end by conduit 88 to conduit 54 in advance of pump P, and its other end by conduit 90, which branches off, with one branch 92, connecting with conduit 78, between valve 74 and cylinders 42R and 42L, the other branch 94, connecting with conduit 84 between valve 80 and cylinders 44R and 44L.

Both, the low pressure and high pressure systems include pressure relief valves; the low pressure system relief means including a relief conduit 96 connected to conduit 54 between pump P and valve 68, and including relief valve 98; the high pressure relief means including relief conduit 100, connected to conduit 88 inwardly of pump P2, and including relief valve 102.

The electrical system of the apparatus is more or less schematically illustrated in FIG. 9 of the drawings. While capable of manual control, it is primarily intended for the automatic control of the apparatus. It may here be stated that the electric system illustrated in the drawings does not include any details of the plastic heating system nor of the plastic discharging system, nor of the air blowing means, all of which may be conventional.

The electric system of the apparatus is arranged to include two substantially identical, parallel circuits having duplicated control elements; each circuit controlling one half of the molding cycle of the two molds. The system is controlled by four limit switches, successively closed by the carriage 12, as it reciprocates back and forth during each cycle of its movement. These include limits switches LS–1 and LS–2, which are hit at the ends of the cycle strokes, limit switches LS–3 and LS–4, each of which is closed by the carriage as it reaches mid-point one of the strokes of its cycle.

The electric system of the apparatus may include clamp switch 104, air blower control switch 106, and switch 108, all of which may be manually pre-set to "automatic" for the automatic operation of the apparatus. The system also may include the main cycle control switch 110, which, when closed, will complete the circuit to ground, through lamp 112, to condition the system for operation.

The electric system is so designed that it may be started with the carriage 12 at any point of its reciprocatory cycle; either from mid-point, as shown in FIGS. 8 and 2, with both molds open; by closing either of a pair of push button switches, PB–1 and PB–2, each of which controls the movement of the carriage in one direction from midpoint, or from any point of the carriage cycle by closing that one of the two switches which controls the carriage movement in that part of the cycle in which it is to be started.

When the carriage 12 is at midpoint, as shown in FIGS. 8 and 2, and one of the switches, as PB–1, is closed, it will activate or energize solenoid 56a of valve 56 (FIG. 8) to supply hydraulic fluid to port 38 of cylinder 34 from conduit 58, to move carriage 12 toward limit switch LS-1 to close it, as mold sections BR and BL are moved to align with parison head 10. Closed switch LS–1 completes a circuit through clamp timer CT–1, which energizes relay R–1 and time delay relay TD–1. Relay R–1 energizes solenoid 80a, to direct fluid through conduit 72 to ports 48 of cylinders 44R and 44L to move mold sections BR and BL toward one another to close mold B, snipping off and enclosing a section of parison tubing 11. (FIG. 3.) The closing of time delay relay TD–1, activates blower timer BT–1, which energizes blower control solenoid 114, of an air blower (not illustrated), to blow air into closed mold B.

The closing of LS–1 also deenergizes solenoid 56a and energizes solenoid 56b, to reverse the flow of fluid through cylinder 34 and start carriage 12 on return stroke, toward limit switch LS–2. As carriage 12 reaches midpoint return stroke, it strikes and closes limit switch LS–3; closed mold B remaining closed and moved away to start the curing period. Closed switch LS–3 deenergizes solenoid 56b, to stop movement of the carriage and closes circuit through the parison time PT for discharging a second section of tubing 11 from parison head 10. When the parison timer runs out, it recloses the circuit through solenoids 56b to continue movement of the carriage 12 to the end of the return stroke, bringing open mold sections AR and AL into alignment with parison head 10. At the same time, limit switch LS–2 is closed.

Closing of LS–2, switches control of the molding cycle to the second of the two circuits of the system by completing a circuit through clamp timer CT–2, which energizes relay R–2 and time delay relay TD–2. Relay R–2 energizes solenoid 74a of valve 74 to direct hydraulic fluid to ports 48 of cylinders 42R and 42L to move mold sections AR and AL toward one another, to close mold A over a section of parison tubing 11. Closing of TD–2 circuit activates blow timer BT–2, which energizes blow control solenoid 116, to blow air into closed mold A.

Closing of LS–2 also deenergizes solenoid 56a and energizes solenoid 56b, to again reverse cylinder 34, and start carriage 12 on a return stroke toward LS–1. As carriage 12 reaches mid-point on the last mentioned stroke, it closes limit switch LS–4. Closing of LS–4 deenergizes solenoid 56a, to halt movement of the carriage. It also deenergizes solenoid 80a and energizes solenoid 80b, to move mold sections BR and BL apart to drop out the cured molded article from mold B. Closed LS–4 also closes the circuit through the parison time PT, to discharge another section of tubing 11, and when parison timer runs out it reenergizes solenoid 56a, to start carriage 12 again on its movement toward switch LS–1. When LS–1 is closed again the cycle of molding begins over again, as described; except that on the next movement of carriage 12 toward LS–2, when it closes LS–3, solenoid 80a is deenergized and 80b energized to open mold A and discharge its cured contents.

This completes the description of one embodiment of the blow-molding apparatus of the present invention, its cycle sequence, and one system for its operation and control. It will be clear, however, that other systems for the operation and control of the apparatus of the invention are available and will readily suggest themselves to those skilled in the art.

It will also be apparent from the foregoing description that, while the apparatus of the invention is of relatively simple construction, utilizing as few as two mold positions and two molds, it is, nevertheless capable of highly efficient high-speed production, due to the overlapping of the molding time cycles of the molds. It will likewise be apparent that the timing of the several steps of the molding cycles may be readily adjusted, to meet varied requirements of molded articles of different characteristics, by the adjustment of the timing of the several control relays and timers of the control system. It will be additionally apparent that the apparatus of the present invention permits the ready and convenient mounting and dismounting of the molds, easy and convenient starting and stopping, and provides safe operation.

It will be further apparent that numerous modifications and variations may be made in the blow-molding of the apparatus of the invention, by any one skilled in the art, in accordance with the principles of the invention above set forth, and without the exercise of any inventive ingenuity. I desire, therefore, to be protected for any and all such modifications and variations that may be made within the spirit of the invention and the scope of the claims hereto appended.

What I claim is:

1. Blow-molding apparatus, of the character described, comprising, in combination, with a fixed parison discharge head, of a carriage, means mounting said carriage below said parison discharge head for reciprocal movement relative thereto, spaced pairs of mold section mounting plates mounted on said carriage for movement toward and away from one another in a direction perpendicular to the direction of movement of said carriage, means for moving said mold section mounting plates toward and away from one another, means reciprocating said carriage from a neutral position whereat said mold section mounting plates are equidistant from said parison discharge head, alternately to a position wherein each of said parison mold section mounting plates is aligned with said parison discharge head, means moving said each pair of mold section mounting plates toward one another when in the last-named position and for spacing each said pair of mold section mounting plates, upon its return to said neutral position, and means actuating said parison head to gradually discharge a parison tube as each said pair of mold section mounting plates is moved from said neutral position to alignment with said parison head and toward one another.

2. Blow molding apparatus, of the character described, comprising, in combination with a fixed parison discharge head of a carriage, means mounting said carriage below said parison discharge head for reciprocal movement relative thereto, spaced pairs of mold section mounting plates mounted on said carriage for movement toward and away from one another in a direction perpendicular to the direction of movement of said carriage, means moving said mold section mounting plates toward and away from one another, means reciprocating said carriage from a neutral position whereat said pairs of mold section mounting plates are equidistant from said parison head, alternately, to a position where each of said pairs of mold section mounting plates is aligned with said parison discharge head, means controlled by the movement of said carriage for actuating said mold section mounting plates moving means, to move each pair of said mold section mounting plates toward one another when aligned with said parison discharge head, and to move each pair of said mold section mounting plates away from one another, when in neutral position and moving in the direction of said parison discharge head, and means actuating said parison head for gradually discharging a parison tube from said parison head when said mold section mounting plates move from neutral position in the direction of said parison discharge head and toward one another.

3. The blow molding apparatus of claim 2, wherein said carriage comprises a pair of upright wall plates and means connecting said plates in spaced parallel relation to one another, said mold section mounting plates supported on said wall plates, and said means supporting said carriage comprises a pair of parallel rails, said wall plates slidably supported on said rails by their lower edges.

4. The blow molding apparatus of claim 2, wherein said means for moving said carriage and said mold section mounting plates is hydraulic and is electrically controlled.

5. The blow molding apparatus of claim 4, wherein said electrically controlled hydraulic carriage-moving means includes limit switches connected in said circuit controlling said hydraulic carriage-moving means, said limit switches each actuated by said carriage at each extreme position in its reciprocal stroke and upon reaching neutral position in its movement in each reciprocal direction.

6. The apparatus of claim 2, wherein the movement of said carriage is interrupted each time it reaches neutral position, and each time one of said pairs of mold section mounting plates is in line with the parison discharge head.

7. The blow molding apparatus of claim 2, wherein the means reciprocating said carriage and moving said mold section mounting plates toward and away from one another comprises an electrically controlled hydraulic system, including a hydraulic cylinder having a port at each end connected in the line of said hydraulic system, and a piston in said cylinder connected to said carriage, and a hydraulic cylinder having a port at each end connected in the hydraulic system and having its piston connected to each mold section mounting plate, said hydraulic electrically controlled system including a four-way valve connected in the hydraulic lines connected to each of said cylinders, and electrically-controlled means for reversing the flow of hydraulic fluid through each said valve to its associated hydraulic cylinder, and means actuated by said carriage connected in the electric circuit of said valve, reversing means for energizing said last-named means for alternating and reversing the flow of hydraulic fluid in said valve.

8. The blow-molding apparatus of claim 2, wherein said means for actuating said parison head to discharge a parison tube comprises limit switch means connected in the circuit of said parison discharge head actuating means engageable by said carriage as each said pair of mold section supporting plates reaches said neutral position in its movement toward said parison head.

References Cited

FOREIGN PATENTS 605,062   5/1960   Italy.

WILBUR L. McBAY, *Primary Examiner.*